Dec. 16, 1930.  E. WILDHABER  1,784,920
TRANSMISSION
Filed July 16, 1928   3 Sheets-Sheet 1

INVENTOR
Ernest Wildhaber

Dec. 16, 1930.　　　　　E. WILDHABER　　　　　1,784,920
TRANSMISSION
Filed July 16, 1928　　3 Sheets-Sheet 2

INVENTOR
Ernest Wildhaber

Dec. 16, 1930.  E. WILDHABER  1,784,920
TRANSMISSION
Filed July 16, 1928  3 Sheets-Sheet 3

INVENTOR
Ernest Wildhaber

Patented Dec. 16, 1930

1,784,920

UNITED STATES PATENT OFFICE

ERNEST WILDHABER, OF BROOKLYN, NEW YORK

TRANSMISSION

Application filed July 16, 1928. Serial No. 292,948.

The present invention relates to transmissions for operatively connecting two members at changeable ratios, and particularly to automotive transmissions which contain a driving element and a coaxial driven element.

One object of the present invention is to provide an automotive transmission which contains no gears which run in mesh when the transmission is operated in direct drive, and which contains novel and simple means for changing the ratio between the driving element and the driven element.

A further object is to provide frictional means for changing the ratio between the driving element and the driven element of a transmission without shock, and in a novel and practical manner.

Another aim in view is to provide a control device for planetary automotive transmissions, which requires the same motions of the operator as conventional gear shift transmissions do. A further object is to provide a control device for planetary transmissions, comprising a selecting lever, a pedal, and an operative connection between said lever and pedal to connect said pedal either with braking means for holding an element of the transmission stationary, or with a friction clutch for effecting direct drive.

A still other purpose is to provide a planetary transmission containing internal orbit gears, braking means for selectively maintaining said orbit gears stationary, a friction clutch for effecting direct drive, means for selectively operating said braking means or said friction clutch with a single pedal, and constantly engaged gripping means disposed as a shock valve between the motor and the transmission.

Other aims will appear in the course of the specification and from recital of the appended claims.

An embodiment of the present invention will be explained with reference to the accompanying drawings, in which Fig. 1 is an axial section of a planetary transmission, along lines 1—1 of Fig. 2.

Fig. 4 is a side view of the rotary transmission cage of the embodiment illustrated also in the other figures, and a view of the transmission control mechanism.

Figure 1:
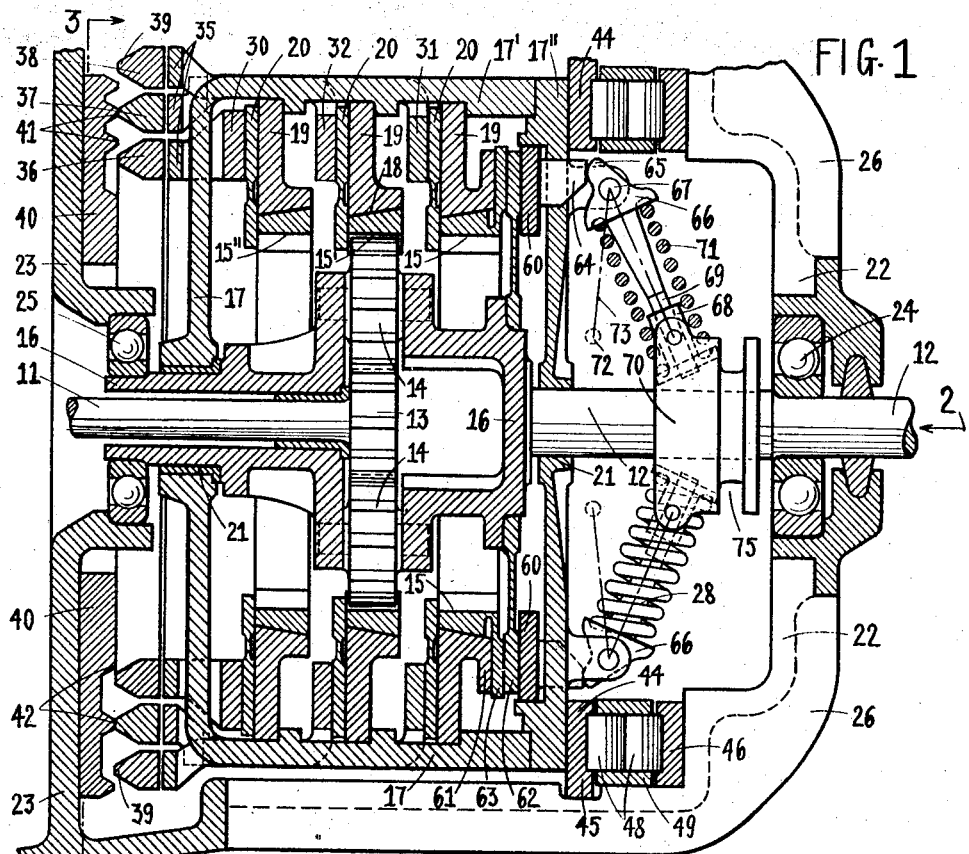

In the drawings, the numeral 11 denotes a driving shaft and 12 denotes a coaxial driven shaft, see Fig. 1. The said two shafts are operatively connected at a changeable ratio, by means of a sun gear 13 rigidly secured to driving shaft 11, by a system of planetary gears of which gears 14 form part, and by internal orbit gears 15, which are suited to be held stationary.

The driven shaft (12) is connected with the planet carrier 16, in which said planetary gears are journalled.

The present invention relates more to the means for operating the transmission and for controlling operation of said transmission, than to the transmission gearing proper. Complete details of a transmission gearing, which fits the drawings of the present application, are given in my copending application, entitled "Transmission", filed on even date herewith, namely on July 16, 1928, Serial No. 292,947.

Internal orbit gears 15 are journalled in a joint rotary member 17 of the form of a cage, by means of single bearings 18 of larger diameter than the tooth zones of said orbit gears. Bearings 18 are disposed on plates 19 which are rigidly secured to member 17 and thus form part of it. The said orbit gears are held in axial direction through the taper of said bearings, which prevents displacement of the orbit gears to the left of Fig. 1, and by disks 20. The said disks are rigidly secured to the orbit gears and bear against said plates 19, so as to prevent axial displacement of the orbit gears to the right of Fig. 1.

Rotary member 17 is journalled with bearings 21 on planet carrier 16, which is itself journalled on the stationary transmission casing 22 and the crank casing 23 of a motor, by means of ball bearings 24, 25. The transmission casing is preferably composed of two parts, held together by flanges 26.

The various ratios or speeds of the transmission are obtained as follows: Reverse gear ratio, low gear ratio and intermediate gear ratio are obtained by holding stationary the orbit gear 15″, or orbit gear 15′, or orbit gear 15 respectively. Direct drive may be effected by locking the planetary gearing so that it turns around as a solid unit. In the illustrated instance orbit gear 15 may be frictionally connected with planet carrier 16, by operating a clutch 28, which will be described hereafter, and which is shown in engaged position in Fig. 1. This clutch also connects member 17 with the planet carrier, so that said member rotates with the planetary unit in direct drive. For this reason there is no relative motion and no friction loss in direct drive, nor any noise caused by intermeshing gears. Inasmuch as most of the automotive transmissions are used chiefly in direct drive, this is an important feature. It is also realized that the large diameter of the bearings 18 for journalling internal orbit gears 15 contains then no disadvantage. The orbit gears turn in their bearings only when one of them is held stationary. The two other orbit gears turn then at a slow rate and practically without load. Friction is not able to create any appreciable amount of heat during the comparatively short duration of relative sliding. On the other hand it is noted that a very simple and rigid structure results with the shown arrangement, that is to say by journalling internal gears 15 on a joint rotary member with single bearings of large diameters.

To maintain an orbit gear (15) stationary, it is frictionally locked to rotary member 17, while the latter is held stationary, as will now be further described.

Orbit gears 15, 15′, 15″ contain disks 20 rigidly secured to them, which may be clamped or frictionally held between the aforesaid plates 19 and axially movable members 30, 31, 32. A plate 19, a member 30, or 31, or 32 and an intermediate disk 20 constitute what might be called a gripping unit. When no pressure is applied between rotary member 17, of which plates 19 form part, and the said axially movable members, then disks 20 touch plates 19 as well as members 30, 31, 32 only slightly, that is to say without pressure. When however axial pressure is applied between rotary member 17 and one of said axially movable members, then the disk 20 engaged by said member is frictionally connected with rotary member 17, and with said disk 20 also the orbit gear which is connected with it.

Axially movable members 30, 31, 32 contain projections reaching through the cage constituted by rotary member 17. A view of said cage and said projections is afforded by Fig. 4. Member 17 is composed of a cage part 17′ having projections 34, and of a cover 17″ bolted to said projections. The projections of the members 31, 32 are seen to fit between the projections 34 of cage 17, in a manner to be axially movable relatively to said cage. Rings 35 are secured to the projections of members 30, 31, 32, adjacent their ends, which reach out of cage 17, see also Fig. 1. The said rings are suited to contact with stationary rings 36, 37, 38, which are prevented from rotation in any suitable manner not further indicated, and which contain narrow ends 39. A selector slide 40, which contains projections 41, 42, is disposed adjacent said narrow ends, and may be moved to selectively contact with them. Slide 40 is also seen in Fig. 3, where its projections 41, 42 are indicated in dotted lines.

Figure 3:
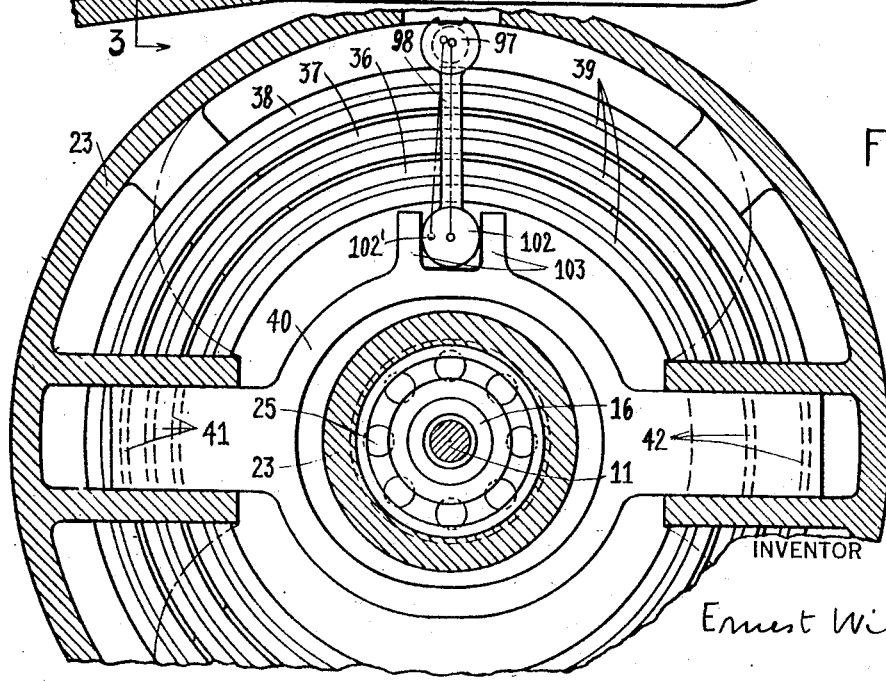
Fig. 3 is a section along lines 3—3 of Fig. 1.

In the central position, as shown in Fig. 1 and Fig. 3, the central projections 41, 42 contact with the middle ring 37. When pressure is now applied between member 17 and slide 40, that is to say between member 17 and casing 23, pressure will be transmitted through said contacting projections to axially movable member 31, and internal orbit gear 15 is frictionally connected with rotary member 17, inasmuch as disk 20 connected with orbit gear 15 is then clamped between member 31 and the adjacent plate 19. Rings 36 and 38 however then find no hold on the selector slide, as projections 41, 42 are positioned at different distances from the transmission center as compared with said rings, and no pressure is transmitted through rings 36 and 38. Consequently the corresponding orbit gears 15′, 15″ are free to turn idly in their bearings.

Projections 41, 42 of selector slide 40 contain a different pitch or different distances between adjacent projections. The projections are so disposed that the outside projections 41, 42 contact with outside ring 38, when slide 40 is shifted to one side of the indicated position, and that the inside projections 41, 42 contact with inside ring 36, when slide 40 is shifted to the other side. In these different positions of slide 40, orbit gear 15′, or orbit gear 15″ respectively, is frictionally connected with joint rotary member 17, whereas the other orbit gears are then free to turn idle.

It has already pointed out that member 17 is a rotary member, which takes part in the rotation of the planetary gearing in direct drive. To effect a gear ratio, it is therefore necessary to not only connect an orbit gear (15, 15′, 15″) with said member, but also to hold member 17 stationary. This is effected in a very simple manner as follows: Pressure is effected in a manner to be described hereafter between a ring 44 engaging cover 17″ of rotary member or cage 17, and casing 23. Ring 44 contains projections 45, which fit suitable recesses provided in transmission casing 22 and which maintain said ring angularly stationary. Pressure is transmitted from ring 44 to rotary member 17, to one of its plates 19, depending on the position of selector slide 40, through a disk 20 to a member 30, 31, 32, and thence through a ring 36, 37, 38 to the selector slide 40. The friction created between stationary ring 44 and member 17, as well as the friction occurring between a stationary ring 36, 37, 38 and ring 35 of a member 30, 31, 32 maintains member 17 stationary. It is realized that no additional movement is required to operate the gripping means for holding member 17 stationary.

Figure 5:
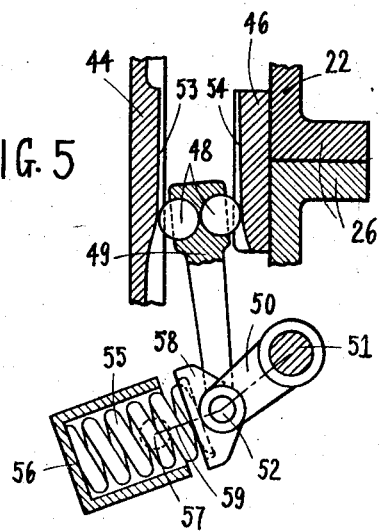

Angularly stationary ring 44 may be pressed towards member 17 by means of two cylindrical rollers 48, which are moved on slightly tapered race ways disposed on ring 44 and on parts 46. These latter are backed up by stationary casing 22, which is rigidly connected with crank casing 23. The structure and operation of rollers 48 will now be explained with reference to Fig. 5 and Fig. 6.

Figure 6:
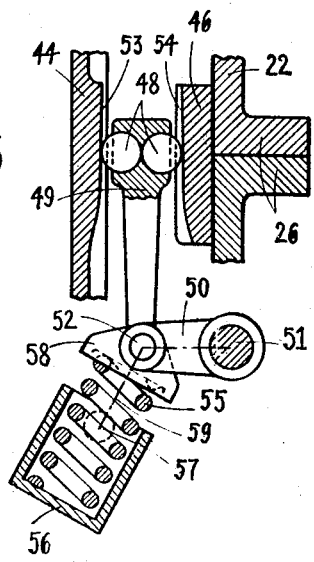
Fig. 5 and Fig. 6 are views, partly in section, of means for effecting axial pressure to lock certain elements of the transmission against rotation. These means form part of the transmission illustrated in the other figures.

Cylindrical rollers 48 are held in a cage 49 of the form of a lever, which is operated by another lever 50. Lever 50 is rotatable on a shaft 51 and is operatively connected with lever 49 by means of a pin 52. In the position shown in Fig. 5 rollers 48 are maintained out of active engagement with the tapered race ways 53, 54, and may contact with said race ways without pressure. Pressure is effected by turning lever 50 upwardly, so that rollers 48 roll upwardly on the said tapered race ways, and separate ring 44 and parts 46 on account of the opposite inclination of said race ways. A final position as indicated in Fig. 6 may thus be arrived at. As the taper of the said race ways is slight, considerable pressure may be exerted in the aforesaid way, that is to say an amount sufficient for the purpose of frictionally locking the members described, and maintaining them stationary. The braking means just described are maintained in engagement under pressure (Fig. 6) by a spring 55, which is contained in a cup 56 pivoted on a stationary portion with pivots 57. Spring 55 acts on a further cup 58 which is pivoted on pin 52. The pressure of the spring extends substantially in the direction of the line connecting the centers of the pivot 57 and pin 52. The disposition is preferably made such, that in the disengaged position of the braking means, Fig. 5, the spring acts in a manner to maintain said disengaged position. This may be accomplished by an arrangement, in which the connecting line 59 between the centers of pivot 57 and pin 52 is inclined in opposite direction to the center line of lever 50, as compared with the engaged position.

To effect direct drive, orbit gear 15 is frictionally locked to planet carrier 16 by a clutch 28, through which a plate 60 may be approached to a flange 61 rigidly secured to rotary member 17, thereby frictionally locking together said plate, said flange, intermediate disk 62, and disk portion 63. The latter is integral with internal orbit gear 15 and connected with it through a thin portion, which permits of some elastic deflection. Disk 62 is connected with planet carrier 16.

Plate 60 contains projections 64 reaching through cover 17″ of rotary member 17, in which the orbit gears 15 are journalled. Each of said projections is acted upon by a tooth 65 of a clutch member 66, which is pivoted at 67 on projections of cover 17″. Integral with clutch member 66 is a rod containing a cylindrical end 69, which is suited to slide in a part 68. The latter is pivoted in a sleeve 70, which is axially movable on driven shaft 12. Clutch member 66 and part 68 form seats for a pressure spring 71. Fig. 1 shows the clutch in engaged position, with teeth 65 acting with maximum pressure on projections 64. When sleeve 70 is moved to the left, see Fig. 1, the clutch members 66 are turned on their pivots 67 in a manner to withdraw their teeth 65 from projections 64. The clutch is completely disengaged, when the pivots of parts 68 have reached a position indicated in dotted lines 72.

In the said disengaged position, springs 71 tend to maintain the clutch disengaged, that is to say to push sleeve 70 further to the left. The springs act namely in the direction of lines 73, which as shown are slightly inwardly inclined. In the partly or completely engaged position of the clutch, springs 71 tend to move sleeve 70 still further outwardly, and therefore tend to complete engagement or to maintain engagement under pressure.

Figure 2:
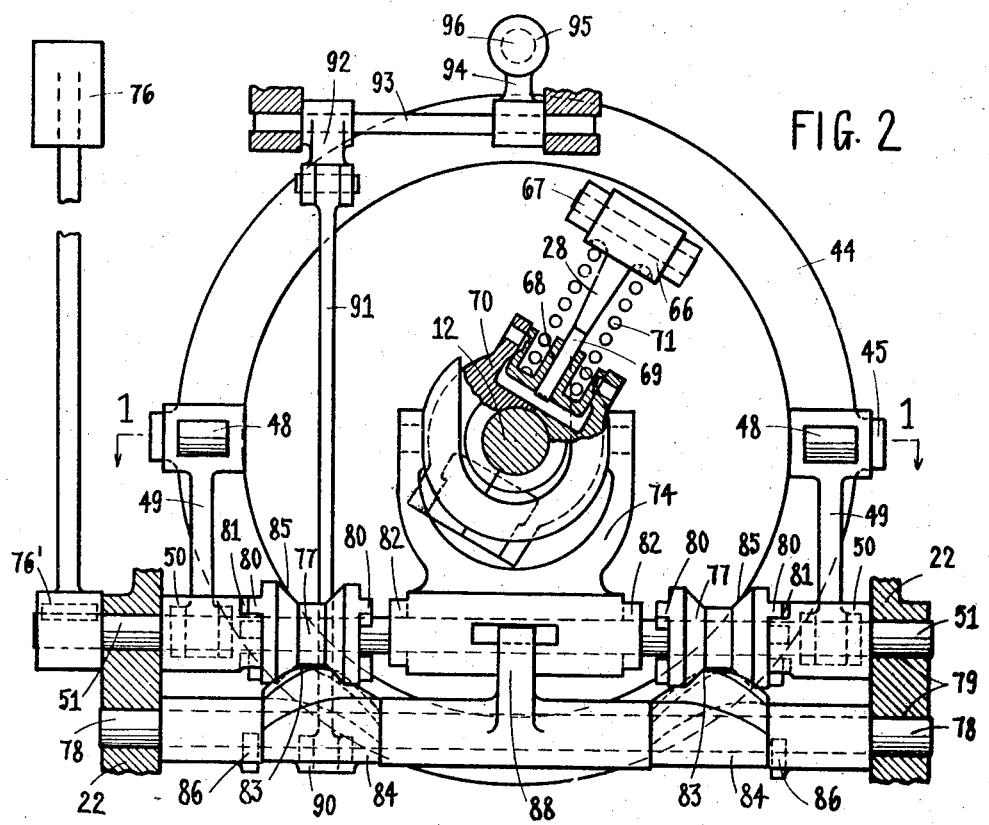
Fig. 2 is an end view, partly a section, corresponding to Fig. 1, the view being taken in the direction of arrow 2 and of the center line of the transmission. The stationary transmission casing is omitted in this figure, except for a few portions shown in section.

Sleeve 70 may be moved axially on shaft 12 by means of a forked lever 74, see also Fig. 2, which contains a flat sided U-shaped member fitting a slot 75 provided in sleeve 70. Lever 74 is loosely mounted on shaft 51, like lever 50 which operates the above described braking means. Shaft 51 may be angularly moved by depressing a pedal 76, which contains a hub 76' keyed to shaft 51. Shaft 51, as well as adjacent shaft 78 are journalled in bearings 79 of casing 22. Pedal 76 is held in high position, that is to say in undepressed position through the action of a spring of conventional structure, which is omitted in the drawing.

Pedal 76 may be operatively connected with the above said clutch or with the above said braking means, but not with both of them together. Means for such selective connection will now be described. They consist in sleeves 77 (Fig. 2) which are axially movable along splines of shaft 51, and which are in constant operative connection with pedal 76 through shaft 51. Sleeves 77 contain tooth projections 80 adjacent their ends, with which they may engage suitable recesses 81, 82 formed on the hubs of levers 50 and 74. In the position indicated in Fig. 2, pedal 76 is operatively connected with levers 50, that is to say with the braking means for effecting a gear ratio. When sleeves 77 are shifted to opposite positions, so that their tooth projections 80 engage the recesses 82 formed in lever 74, pedal 76 is operatively connected with the friction clutch, which effects direct drive.

Figure 9:
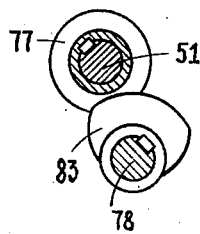
Fig. 8 and Fig. 9 are axial views of detail means used in the transmission illustrated in the other figures, the two figures being illustrative of two different positions.
Figure 8:
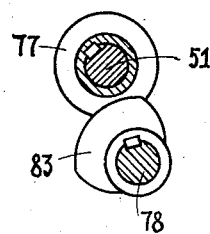

Sleeves 77 may be axially shifted by means of helicoidal projections 83 disposed on parts 84, which are rigidly secured to shaft 78. The helicoidal projections act on the tapered sides of the circular recesses 85 provided on sleeves 77. End views of sleeves 77 and helicoidal projections 83 are afforded by Fig. 8 and Fig. 9, which illustrate two angular positions of said helicoidal projections. An angular displacement of a helicoidal projection corresponds to an axial displacement of the engaged sleeve 77.

Shaft 78 carries further parts rigidly secured to it, which contain finger like projections 86, 88 suited to engage recesses provided on the hubs of levers 50 and 74 respectively. Fig. 2 and Fig. 4 illustrate a position, in which finger 88 has engaged a recess of lever 74 and thereby maintains said lever positively in the shown position, which corresponds to the disengaged position of the clutch. Fingers 86 act in an analogous manner on levers 50 and positively lock them in disengaged position, when the clutch is engaged. The operation will be further described hereafter.

Figure 7:
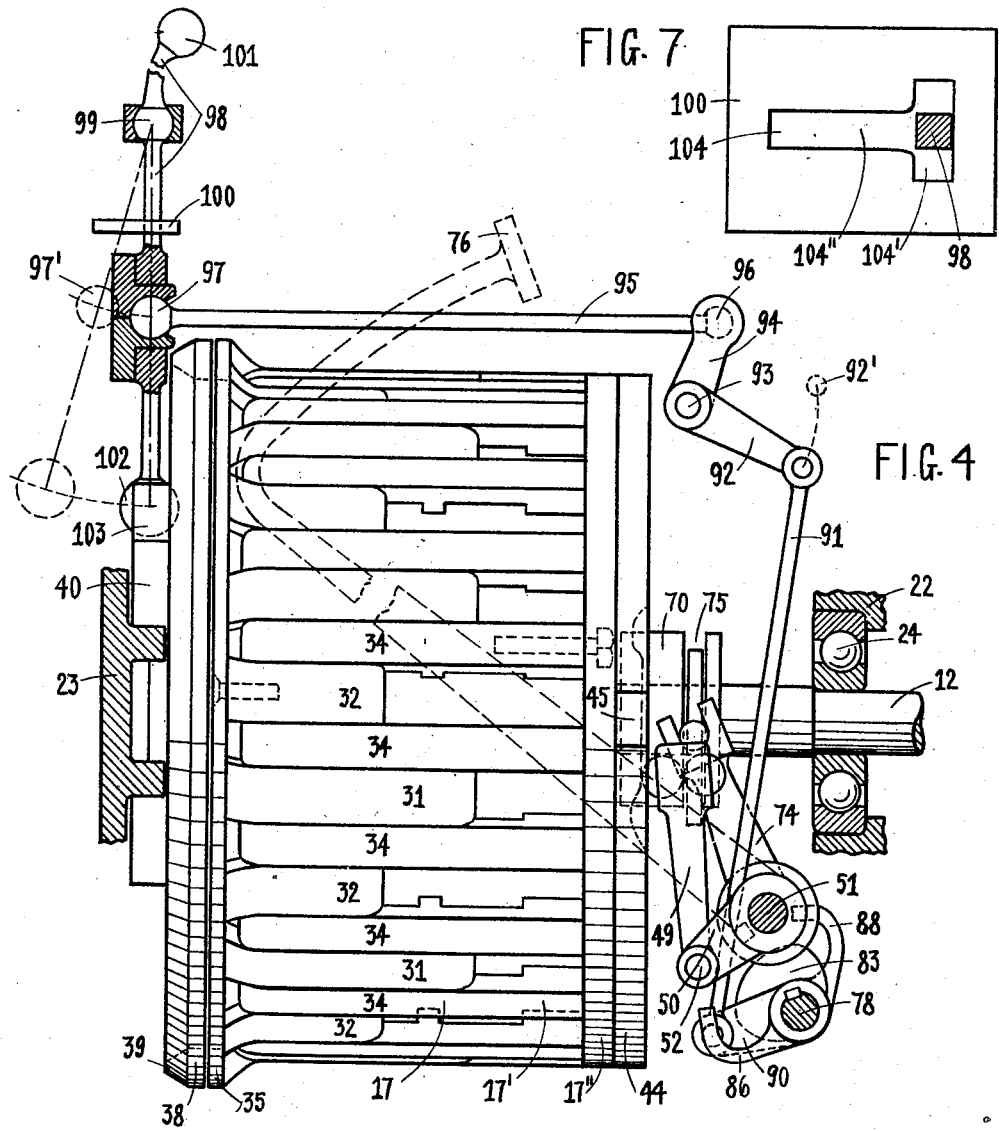
Fig. 7 is a view of a templet for controlling the motion of the hand lever (98), the scale of this view being enlarged as compared with the scale of the other figures.

Shaft 78 may be angularly moved by means of a lever arm 90 of the part containing a helicoidal projection 83, a rod 91, lever 92 connected through a shaft 93 with a lever 94, and a further rod 95 having ball ends 96, 97. Ball end 97 forms part of a ball joint disposed on a hand lever 98, which is pivoted on a stationary ball joint 99, and which is movable in two directions angularly disposed to each other and controlled by a templet 100, secured to a stationary portion omitted in the drawing. This templet contains a T-slot through which lever 98 passes and which is clearly indicated in the enlarged view Fig. 7.

Adjacent one end lever 98 contains a spherical knob 101 for operation by hand and adjacent its other end a ball 102, which engages projections 103 of the selector slide 40 already described. To select a gear ratio, hand lever 98 is turned on ball joint 99 in a manner that it remains in a plane perpendicular to the plane of the drawing, Fig. 4. In other words it is turned about an axis parallel to the transmission axis, so that lever 98 remains in the portion 104' of T-slot 104. The center of ball 102 then may assume a position 102', see Fig. 3.

To select direct drive, hand lever 98 is turned on ball joint 99 in a manner corresponding to a turning motion about an axis perpendicular to the plane of the drawing, Fig. 4, so that it moves in portion 104'' of the said T-slot 104.

Hand lever 98 may be held in any one selected position by known spring means omitted in the drawing.

Selection is effected when pedal 76 is depressed, as indicated in Fig. 4. This figure corresponds to a selection of a gear ratio. When selecting direct drive, ball end 97 is moved into dotted position 97', rods 91, 95 as well as levers 92, 94 are correspondingly displaced, the pin connecting lever 92 with rod 91 moving into dotted position 92'. Shaft 78 is turned, in a manner that finger 88 leaves the recess of lever 74, and the fingers 86 engage the corresponding recesses provided in levers 50. The latter are thereby positively locked in disengaged position. Through the turning motion of shaft 78 sleeves 77 are shifted through the helicoidal projections 83 out of engagement with levers 50 and into engagement with clutch lever 74. When pedal 76 is now released, it engages the aforesaid friction clutch and effects direct drive.

To effect a gear reduction, pedal 76 is depressed, hand lever 98 is set to correspond to said reduction as has been set forth, and the pedal is then again released. Levers 50 thereby move upwardly, and rollers 48 effect axial pressure between selector slide 40 and joint rotary member 17, thereby frictionally locking a selected orbit gear 15, 15', 15'' to member 17, and maintaining member 17 stationary.

Shaft 11 may be directly connected with the crank shaft of a motor, if so desired, but preferably constantly engaged gripping means are interposed in the line of power transmission. Gripping means of a preferred structure are disclosed in my copending application, entitled "Gripping device", filed February 23, 1928, Serial No. 256,283. The said gripping means comprise frictional surfaces which are maintained constantly engaged under pressure and thereby differ from a clutch. They are suited to act as a shock valve by permitting slippage under excessive loads, and prevent damage also when the transmission is carelessly handled.

Figure 10:
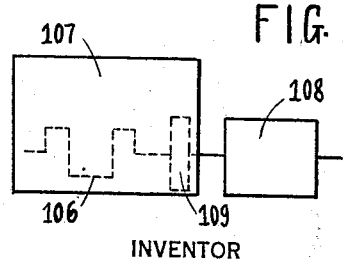
Fig. 10 is a diagram explanatory of a preferred arrangement in accordance with the present invention.

This brief description will enable those skilled in the art to readily understand the purpose and the general structure of said gripping means. A preferred general arrangement is diagrammatically indicated in Fig. 10, where 106 denotes the crank shaft of a motor 107, and where 108 denotes a transmission of the character hereinbefore described. Gripping means 109 are disposed intermediate crank shaft 106 and transmission 108, and are preferably combined with the fly wheel of the motor.

Many modifications may be made in my invention without departing from its spirit. For definition of its scope it is relied on the appended claims.

What I claim is:

1. In a planetary transmission, frictional clutching means for effecting direct drive, spring means in constant operative connection with said clutching means for maintaining said clutching means in engagement under pressure, a brake for maintaining a member of the transmission stationary, other spring means in constant operative connection with said brake for maintaining said brake in engagement, a pedal, and means for operatively connecting said pedal selectively with said clutching means and with said brake.

2. In a transmission, gears, a joint rotary member, a plurality of gripping units for connecting individual gears with said joint rotary member, other gripping means disposed adjacent said joint member for frictionally locking said joint member to another part of the transmission, a pedal, a selector, and means for effecting an operative connection between said pedal said other gripping means and a selected gripping unit, for operating said other gripping means and said gripping unit with said pedal.

3. In a transmission, gears, a joint rotary member, a plurality of gripping units for selectively connecting individual gears with said joint rotary member, other gripping means disposed adjacent said joint member for frictionally locking said joint member to another part of the transmission, a pedal, and an operative connection between said pedal, a gripping unit and said other gripping means for simultaneously operating a gripping unit and said other gripping means with said pedal.

4. In a transmission, gears, a joint rotary member, a plurality of gripping units for selectively connecting individual gears with said joint rotary member, said gripping units containing axially engaging frictional surfaces, other gripping means disposed adjacent said joint member for frictionally locking said joint member to another part of the transmission, a pedal, and an operative connection between said pedal, a gripping unit and said other gripping means for operating a gripping unit and said other gripping means in the same stroke with said pedal.

5. In a control mechanism for planetary automotive transmissions, a hand lever for selecting a ratio, means for confining motion of said hand lever to two directions angularly disposed to each other, the position of the lever corresponding to an intermediate gear reduction being disposed at the joining point of said two directions, a pedal, means for effecting a ratio after selection, and an operative connection between said means and said pedal.

6. In a planetary transmission, frictional clutching means for locking the planetary gearing to effect direct drive, spring means disposed in constant operative connection with said clutching means, said spring means being disposed to store up a maximum energy intermediate the fully engaged and the fully disengaged position of said clutching means so as to maintain said clutching means in engaged position as well as in disengaged position, a brake for maintaining a member of the transmission stationary, spring means in constant operative connection with said brake, a pedal, and means for selectively connecting said pedal with said clutching means and said brake.

7. In an automotive transmission, a plurality of rotary elements, a stationary element, clutching means for effecting a frictional connection between two of said rotary elements, spring means in constant operative connection with said clutching means, said spring means being disposed to store up a maximum energy intermediate the fully engaged and the fully disengaged position of said clutching means so as to maintain said clutching means in engaged position as well as in disengaged position, a gripping unit for effecting another frictional connection, spring means in constant operative connection with said gripping unit, a pedal, other spring means operatively connected with said pedal, and means for operatively connecting said pedal selectively with said clutching means and said gripping unit.

8. In a transmission, a plurality of elements rotatable on the same axis relatively to each other, means for operatively connecting said elements, at least two gripping members for selectively connecting said elements through friction, individual spring means in constant operative connection with each of said two gripping members respectively for maintaining said gripping members in engagement under pressure, a pedal, means for selecting a gripping member, and means for operatively connecting said pedal with the selected gripping member.

9. In a transmission, a plurality of elements rotatable on the same axis relatively to each other, means for operatively connecting said elements, at least two gripping members for selectively connecting said elements through friction, individual spring means in constant operative connection with each of said two gripping members respectively for maintaining said gripping members in engagement under pressure, said spring means being disposed to store up a maximum energy intermediate the fully engaged and the fully disengaged position of the respective gripping member, a pedal, and means for operatively connecting said pedal selectively with said gripping members.

10. In a planetary transmission, frictional clutching means for effecting direct drive, a brake for maintaining a member of the transmission stationary to effect a gear reduction, individual spring means in constant operative connection with said clutching means and with said brake respectively, both of said individual spring means being disposed to store up a maximum energy intermediate the fully engaged and the fully disengaged position of said clutching means and of said brake respectively, a pedal, and means for operatively connecting said pedal selectively with said clutching means and with said brake.

11. In a planetary transmission, a clutch, a brake, spring means in constant operative connection with said clutch for maintaining the clutch in engagement, other spring means in constant operative connection with said brake for maintaining said brake in engagement, a pedal, means for operatively connecting said pedal selectively with said clutch and said brake, and positive means for maintaining said brake and said clutch respectively in disengaged position, when said clutch and said brake respectively is engaged.

12. In a planetary transmission, a clutch, a brake, a pedal, means for operatively connecting said pedal selectively with said clutch and with said brake, and positive means for maintaining said brake and said clutch respectively in disengaged position, when said clutch and said brake respectively is engaged.

ERNEST WILDHABER.